United States Patent
Cromer et al.

(10) Patent No.: US 8,762,601 B2
(45) Date of Patent: Jun. 24, 2014

(54) APPARATUS, SYSTEM, AND METHOD FOR BUFFERING WRITE DATA IN RESPONSE TO MOTION

(75) Inventors: Daryl C. Cromer, Apex, NC (US); Howard J. Locker, Cary, NC (US); Tin-Lup Wong, Chapel Hill, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 1248 days.

(21) Appl. No.: 11/273,360

(22) Filed: Nov. 14, 2005

(65) Prior Publication Data
US 2007/0113286 A1 May 17, 2007

(51) Int. Cl.
*G06F 3/00* (2006.01)

(52) U.S. Cl.
USPC .......................................................... 710/52

(58) Field of Classification Search
None
See application file for complete search history.

(56) References Cited

U.S. PATENT DOCUMENTS

| | | | | |
|---|---|---|---|---|
| 5,333,138 A | * | 7/1994 | Richards et al. | 360/75 |
| 5,963,392 A | * | 10/1999 | Sri-Jayantha et al. | 360/75 |
| 6,067,203 A | | 5/2000 | Ottesen et al. | 360/73.03 |
| 6,101,062 A | | 8/2000 | Jen | 360/75 |
| 6,295,577 B1 | | 9/2001 | Anderson et al. | |
| 6,603,620 B1 | | 8/2003 | Berding | 360/60 |
| 7,042,663 B2 | * | 5/2006 | Shimotono et al. | 360/31 |
| 7,164,634 B2 | * | 1/2007 | Dong et al. | 369/47.33 |
| 2003/0067705 A1 | | 4/2003 | Ishiyama et al. | 360/75 |
| 2004/0125490 A1 | | 7/2004 | Fujiki et al. | 360/75 |
| 2004/0125493 A1 | | 7/2004 | Shimotono et al. | 360/75 |
| 2006/0215307 A1 | * | 9/2006 | Yoshida et al. | 360/75 |

FOREIGN PATENT DOCUMENTS

| | | | |
|---|---|---|---|
| DE | 10105395 A1 | 9/2001 | |
| JP | 04-105667 | 4/1992 | A63B 71/06 |
| JP | 09-190293 | 7/1997 | G06F 3/06 |
| JP | 11-306748 | 11/1999 | G11B 33/08 |
| JP | 2000-251396 | 9/2000 | G11B 20/10 |
| JP | 2004-139483 | 5/2004 | G06F 11/34 |
| JP | 2004-178078 | 6/2004 | G06F 3/12 |
| JP | 2005-280992 | 10/2005 | B66F 9/24 |

\* cited by examiner

*Primary Examiner* — Idriss N Alrobaye
*Assistant Examiner* — Richard B Franklin
(74) *Attorney, Agent, or Firm* — Kunzler Law Group

(57) ABSTRACT

An apparatus, system, and method are disclosed for buffering write data. A motion sensor module senses the motion of a motion-sensitive storage device. A direction module writes data to a buffer if the motion exceeds a threshold motion. The direction module further writes the data to the motion-sensitive storage device if the motion does not exceed the threshold motion. In one embodiment, a write module writes the data from the buffer to the motion-sensitive storage device when the motion does not exceed the threshold motion.

23 Claims, 6 Drawing Sheets

APPARATUS, SYSTEM, AND METHOD FOR BUFFERING WRITE DATA IN RESPONSE TO MOTION

BACKGROUND OF THE INVENTION

1. Field of the Invention

This invention relates to buffering write data and more particularly relates to buffering write data in response to motion.

2. Description of the Related Art

Computing functions are increasingly performed in contexts where computing device motion is inherent. For example, computing devices such as laptops, Personal Digital Assistants ("PDAs"), portable music players, cell phones, tablet personal computers, and the like are regularly used in motion, either from the motion of a user or from the motion of a vehicle.

Typically, these computing devices include one or more internal devices having mechanically moving parts. Even devices such as a PDA that ordinarily include internal devices with non-moving parts may temporarily include a storage device such as a micro hard disk drive ("HDD") that includes mechanically moving parts. The devices having mechanically moving parts that are internal to, or operate in conjunction with, the computing devices are referred to herein as "motion-sensitive devices."

Unfortunately, motion-sensitive devices remain highly susceptible to serious damage when the operation of the motion-sensitive device is combined with movement of the motion-sensitive device itself. Typically, movement of the computing device also moves the motion-sensitive device. These movements may include careful calculated movements, bumping, jarring, drops, movement of the base on which the computing device rests, and the like. Often these movements adversely affect the movement of the internal parts of the motion-sensitive device. The interference caused by movement of the computing device can cause serious damage to the internal moving parts as well as to other parts in the motion-sensitive device.

The actual damage caused as well as the probability for damage due to movement of the motion-sensitive device is typically greatest during periods of time when the motion-sensitive device is most active and the motion-sensitive device is simultaneously in motion. Placing the motion-sensitive device in motion increases the likelihood of a damaging movement. Operating the motion-sensitive device during motion enhances the risk that damage will result from movement of the motion-sensitive device.

Motion-sensitive storage devices such as HDDs and the like are particularly vulnerable to motion-related damage as motion-sensitive storage devices ("MSSD") are often used by computing functions. For example, a computing device frequently writes data to a HDD, increasing the chance that data will be written with the computing device and HDD are in motion.

From the foregoing discussion, it should be apparent that a need exists for an apparatus, system, and method that buffer writes to a MSSD while the MSSD is in motion. Beneficially, such an apparatus, system, and method would reduce motion-related damage to the MSSD.

SUMMARY OF THE INVENTION

The present invention has been developed in response to the present state of the art, and in particular, in response to the problems and needs in the art that have not yet been fully solved by currently available methods for writing data to MSSDs. Accordingly, the present invention has been developed to provide an apparatus, system, and method for buffering data writes during motion that overcome many or all of the above-discussed shortcomings in the art.

The apparatus to buffer write is provided with a logic unit containing a plurality of modules configured to functionally execute the necessary steps of sensing motion and writing data to a buffer if the motion exceeds a threshold motion. These modules in the described embodiments include a motion sensor module and a direction module.

The motion sensor module senses the motion of a MSSD. The motion sensor module may include an accelerometer connected to the MSSD. The MSSD may be a HDD, an optical storage drive, or the like. In one embodiment, the motion sensor module communicates motion data such as acceleration. In alternate embodiment, the motion sensor is programmed with a threshold motion and communicates that the motion exceeds the threshold motion.

The direction module writes data to a buffer if the motion exceeds the threshold motion and to the MSSD if the motion does not exceed the threshold motion. In one embodiment, the direction module receives motion data from the motion sensor and determines if the motion exceeds the threshold motion. In an alternate embodiment, the direction module receives notification from the motion sensor module that the motion exceeds the threshold motion.

The apparatus senses the motion of the MSSD and writes data to the MSSD when the motion of the MSSD does not exceed the threshold motion while writing the data to the buffer when the motion of the MSSD exceeds the threshold motion. By avoiding writes to the MSSD while the motion of the MSSD exceeds the threshold motion, the apparatus may reduce the risk of motion-related damage to the MSSD.

A system of the present invention is also presented to buffer write data. The system may be embodied in a mobile computing device such as a laptop computer. In particular, the system, in one embodiment, includes a computation module, a memory module, a MSSD, a motion sensor module, and a direction module. The system may further include a write module.

The computation module executes software instructions and processes data. The memory module stores the software instructions and data. The MSSD also stores the software instructions and data. The MSSD may be configured as a non-volatile storage device while the memory module stores smaller quantities of software instructions and data with lower access latencies.

The computation module may periodically write data to the MSSD. The motion sensor module senses the motion of the MSSD. The direction module writes the data to a buffer if the motion exceeds a threshold motion and to the MSSD if the motion does not exceed the threshold motion. In one embodiment, the memory module comprises the buffer.

In one embodiment, the write module writes the data from the buffer to the MSSD when the motion does not exceed the threshold motion. The system reduces motion-related damage to the MSSD by writing the data destined for the MSSD to a buffer until the motion of the MSSD falls below the threshold motion.

A method of the present invention is also presented for buffering write data. The method in the disclosed embodiments substantially includes the steps necessary to carry out the functions presented above with respect to the operation of the described apparatus and system. In one embodiment, the method includes sensing motion and writing data to a buffer if the motion exceeds a threshold motion. The method also may include modifying a threshold motion, modifying a buffer size, and writing buffer data to an MSSD.

In one embodiment, a threshold modification module modifies a threshold motion in response to a storage requirement of a software process. In addition, a buffer modification module may modify the size of a buffer in response to the storage requirement of the software process. A motion sensor module senses the motion of a MSSD. A direction module writes data to the buffer if the motion exceeds the threshold motion. In addition, the direction module writes the data to the MSSD if the motion does not exceed the threshold motion.

In one embodiment, a write module writes the data from the buffer to the MSSD when the motion does not exceed the threshold motion. The method allows the software process to write data when needed, although the data is only written to the MSSD when the motion of the MSSD does not exceed the threshold motion.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention buffers write data destined for a MSSD when the motion of the MSSD exceeds a threshold motion. In addition, the present invention may reduce motion-related damage to the MSSD by decreasing data writes to the MSSD while the MSSD is in motion. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operation data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
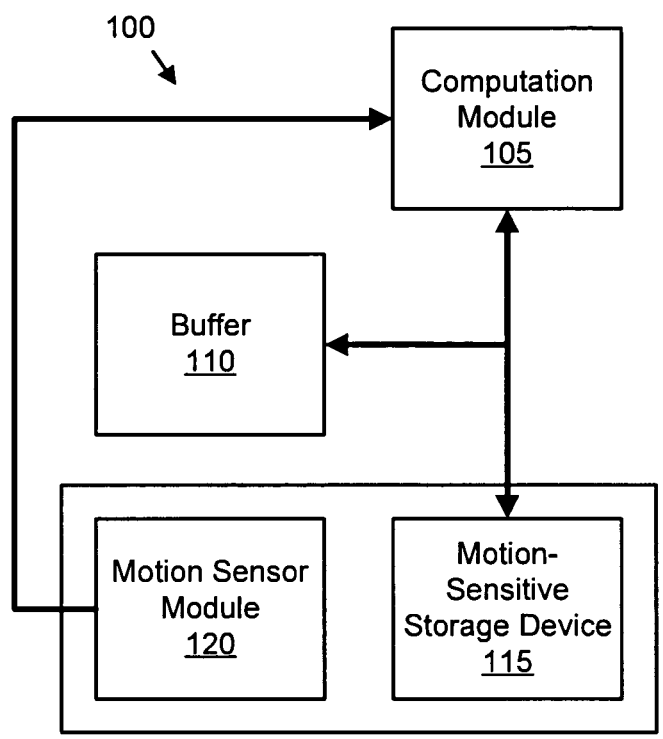
FIG. 1 is a schematic block diagram illustrating one embodiment of a computing device of the present invention.

FIG. 1 is a schematic block diagram illustrating one embodiment of a computing device 100 of the present invention. The device 100 includes a computation module 105, a buffer 110, a MSSD 115, and a motion sensor module 120. The computing device 100 may be a laptop computer, a PDA, a cellular telephone, a tablet computer, a wireless email device, or the like.

The computation module 105 and stores and executes software instructions and processes data, the software instructions and data referred to herein as data. The MSSD 115 stores data for the computation module 105. The MSSD 115 may be a non-volatile storage device such as a HDD, an optical storage device, or the like. The buffer 110 may be a storage device such as dynamic random access memory ("DRAM"), static random access memory ("SRAM"), flash random access memory ("Flash RAM"), and the like. In one embodiment, the computation module 105 comprises the buffer 110. In an alternate embodiment, the MSSD 115 comprises the buffer 110. The buffer 110 may not contain moving parts.

The MSSD 115 includes one or more moving components. The moving components may operate with small tolerances and be susceptible to damage if operated while the MSSD 115 is in motion. Thus the MSSD 115 is more susceptible to motion-related damage than the buffer 110.

The computation module 105 may write data to the MSSD 115 at various times including while the computing device 100 and the MSSD 115 are in motion. If the computation module 105 writes data to the MSSD 115 while the computing device 100 and MSSD 115 are in significant motion, the MSSD 115 may be damaged.

The device 100 senses the motion of the MSSD 115 with the motion sensor module 120 when the computation module 105 will write the data to the MSSD 115. If the motion of the MSSD 115 exceeds a specified threshold motion, the device 100 writes the data to the buffer 110 instead of the MSSD 115. Thus the MSSD 115 does not write data when susceptible to motion-related damage.

Figure 2:
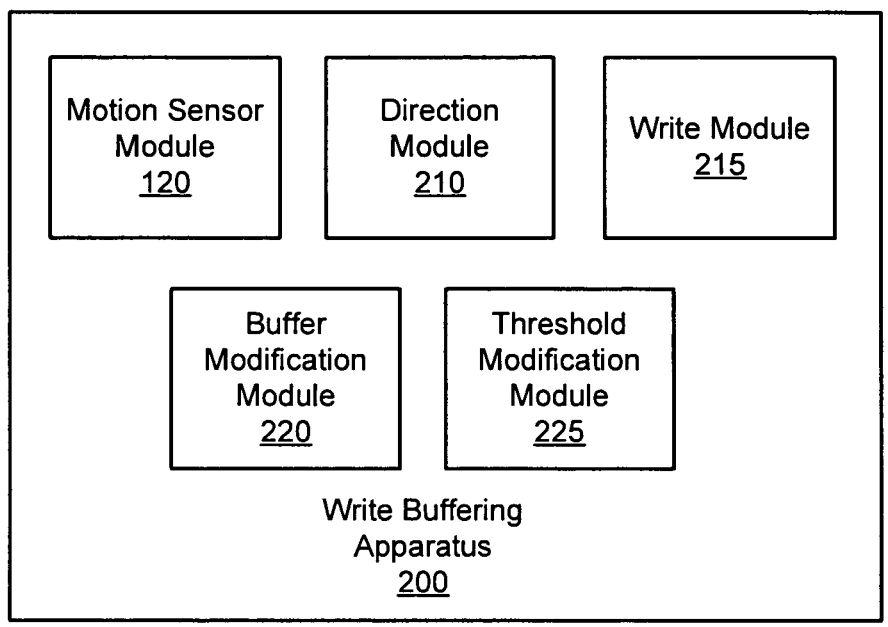
FIG. 2 is a schematic block diagram illustrating one embodiment of a write buffering apparatus of the present invention.

FIG. 2 is a schematic block diagram illustrating one embodiment of a write buffering apparatus 200 of the present invention. In one embodiment, the computation module 105 and the motion sensor module 120 of FIG. 1 comprise the apparatus 200. The apparatus 200 includes a motion sensor module 120, a direction module 210, a write module 215, a buffer modification module 220, and a threshold modification module 225.

The motion sensor module 120 senses the motion of a MSSD 115 such as the MSSD 115 of FIG. 1. The motion sensor module 120 may comprise an accelerometer as is well known to those skilled in the art. In one embodiment, the motion sensor module 120 senses the acceleration of the MSSD 115 as motion data. In an alternate embodiment, the motion sensor module 120 senses the derivative of acceleration with respect to the time as the motion data.

In one embodiment, the motion sensor module 120 communicates the motion data to the direction module 210. For example, the motion sensor module 120 may communicate an acceleration of two gravities (2 g) to the direction module 210. In alternate embodiment, the motion sensor module 120 is configured with a threshold motion and communicates to the direction module 210 that the motion of the MSSD 115 exceeds the threshold motion. For example, if the threshold motion is one gravity (1 g), the motion sensor module 120 may notify the direction module 210 when the motion of the MSSD 115 exceeds one gravity (1 g).

The direction module 210 writes data from the computation module 105 to a buffer 110 such as the buffer 110 of FIG. 1 if the motion of the MSSD 115 exceeds the threshold motion and to the MSSD 115 if the motion of the MSSD 115 does not exceed the threshold motion. For example, if the threshold motion is one gravity (1 g) and the motion sensor module 120 communicates motion data to the direction module 210 indicating that the motion of the MSSD 115 is two gravities (2 g), the direction module 210 may divert data communicated from the computation module 105 to MSSD 115 and instead write the data to the buffer 110.

In one embodiment, the write module 215 writes the data from the buffer 110 to the MSSD 115 when the motion of the MSSD 115 does not exceed the threshold motion. In the example above, if the write module 215 determines that the motion of the MSSD 115 has fallen below the threshold motion of one gravity (1 g), the write module 215 may read the data from the buffer 110 and write the data to the MSSD 115. Thus the data is written to the MSSD 115, but instead of being written when the MSSD 115 is more susceptible to motion-related damage, the data is written when the MSSD 115 is less susceptible to motion-related damage.

In one embodiment, the threshold modification module 225 modifies the threshold motion. For example, the threshold modification module 225 may modify the threshold motion from one gravity (1 g) to two gravities (2 g). The threshold modification module 225 may modify the threshold motion in response to a storage requirement of a software process. For example, the software process may require that data be written from the computation module 105 to the MSSD 115 with minimal delay. Therefore the threshold modification module 225 may modify the threshold motion from one gravity (1 g) to two gravities (2 g) to allow the computation module 105 to write directly to the MSSD 115 more frequently.

In one embodiment, the buffer modification module 220 modifies the buffer 110 size. For example, the buffer 110 may comprise a portion of DRAM memory such as one megabyte (1 MB) of memory. The buffer modification module 220 may modify the buffer 110 size from one megabyte (1 MB) to two megabytes (2 MB) of memory. In one embodiment, the buffer modification module 220 modifies the buffer 110 size in response to the storage requirement of the software process. For example, if the software process needed to save four megabyte (4 MB) quantities of data to the MSSD 115, the buffer modification module 220 may modify the buffer 110 size to five megabytes (5 MB).

The apparatus 200 reduces motion-related damage to the MSSD 115 by writing the data destined for the MSSD 115 to the buffer 110 until the motion of the MSSD 115 falls below the threshold motion. In addition, the apparatus 200 allows a software process to send data to the MSSD 115 without delays that may impact the performance of the software process.

Figure 3:
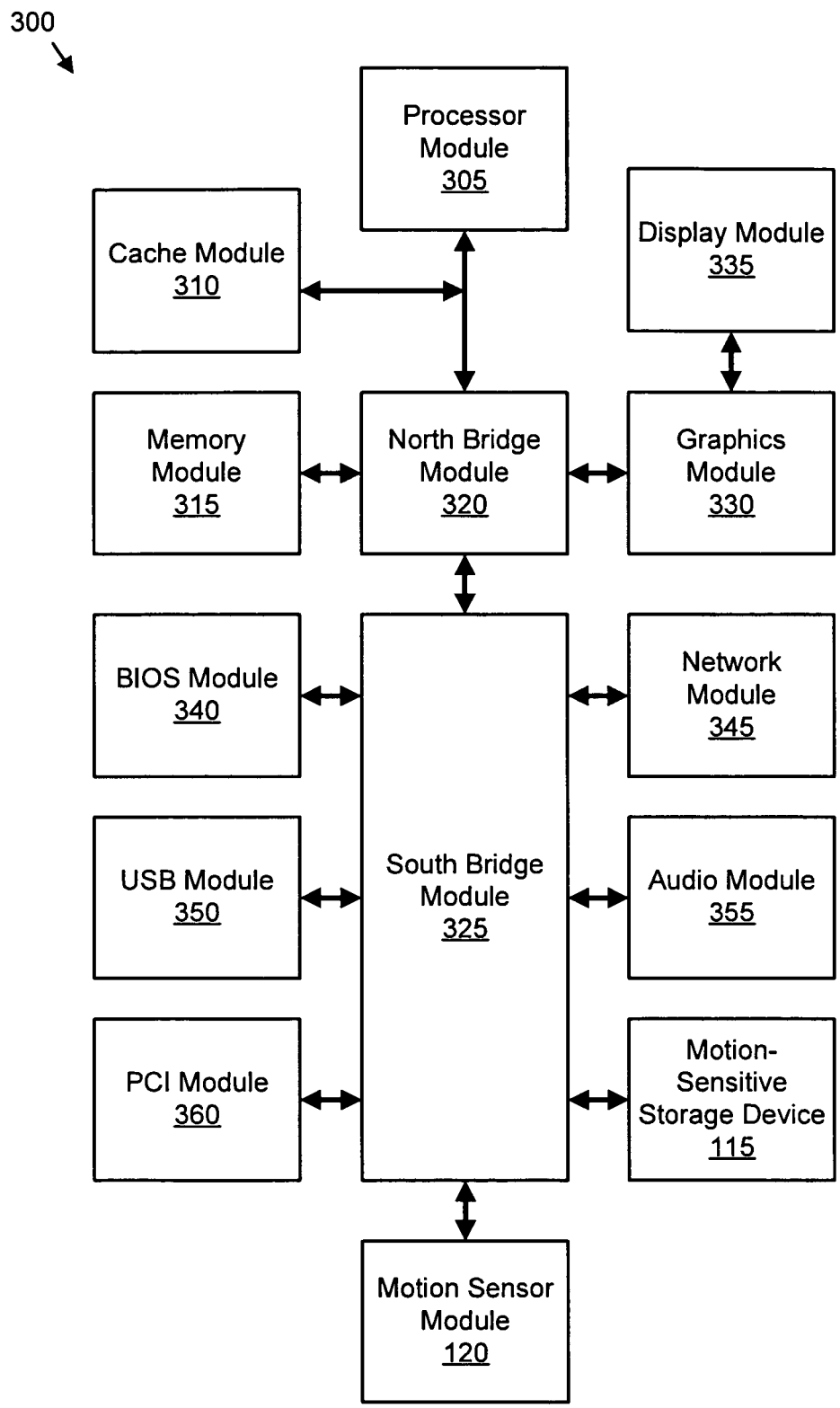
FIG. 3 is a schematic block diagram illustrating one embodiment of a mobile computing device of the present invention.

FIG. 3 is a schematic block diagram illustrating one embodiment of a mobile computing device 300 in accordance with the present invention. The device 300 may be a laptop computer or the like. In one embodiment, the device 300 is the computing device 100 of FIG. 1. As depicted, the device 300 includes a processor module 305, a cache module 310, a memory module 315, a north bridge module 320, a south bridge module 325, a graphics module 330, a display module 335, a basic input/output system ("BIOS") module 340, a network module 345, a universal serial bus ("USB") module 350, an audio module 355, a peripheral component interconnect ("PCI") module 360, a MSSD 115, and a motion sensor module 120.

The processor module 305, cache module 310, memory module 315, north bridge module 320, south bridge module 325, graphics module 330, display module 335, BIOS module 340, network module 345, USB module 350, audio module 355, and PCI module 360, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate to substrate wiring, or circuit card traces or wires connecting the semiconductor devices.

The memory module 315 stores data. In one embodiment, the memory module 315 comprises the buffer 110 of FIG. 1. The processor module 305 executes the data as is well know to those skilled in the art. The computation module 105 of FIG. 1 may comprise the processor module 305, as well as the north bridge module 320 and the south bridge module 325.

In one embodiment, the motion sensor module 120 is highly sensitive to acceleration. The motion sensor module 120 may comprise a separate motion sensing component or may comprise logic that communicates with existing hardware such as an existing accelerometer. Examples of accelerometers that may be used in the tracking module 302 include iMEMS® accelerometers available from Analog Devices of Norwood, Mass.

In one embodiment, the motion sensor module 120 comprises an accelerometer physically connected to the MSSD 115. The accelerometer generates an analog electrical signal in response to the acceleration of the MMSD 115. The motion sensor module 120 may further comprise an analog to digital converter to convert the analog signal into a digital value. In a certain embodiment, the motion sensor module 120 further processes the digital value to create motion data representative of the acceleration of the accelerometer and the MSSD 115.

In one embodiment, the memory module 315 stores and the processor module 305 executes one or more software processes comprising the direction module 210, the write module 215, the buffer modification module 220, and the threshold modification module 225 of FIG. 2. In addition, the memory module 315 may store and the processor module 305 execute one or more software processes comprising a software application, an operating system, an intermediate driver, and a device driver such as a MSSD 115 device drive.

The software application or the operating system may write data through the MSSD 115 driver, the north bridge module 320, and the south bridge module 325 to the MSSD 115. In one embodiment, the direction module 210 executing on the processor module 305 receives motion data through the south bridge module 325 and north bridge module 320 from the motion sensor module 120. If the motion data exceeds a threshold motion, the direction module 210 executing on the processor module 305 may divert data directed from the operating system or software application to a buffer 110 residing on the memory module 315. The write module 215 executing on the processor module 305 may further write the data from the buffer 110 to the MSSD through the north bridge module 320 and south bridge module 325 when the motion data from the motion sensor module 120 does not exceed the threshold motion.

Figure 4:
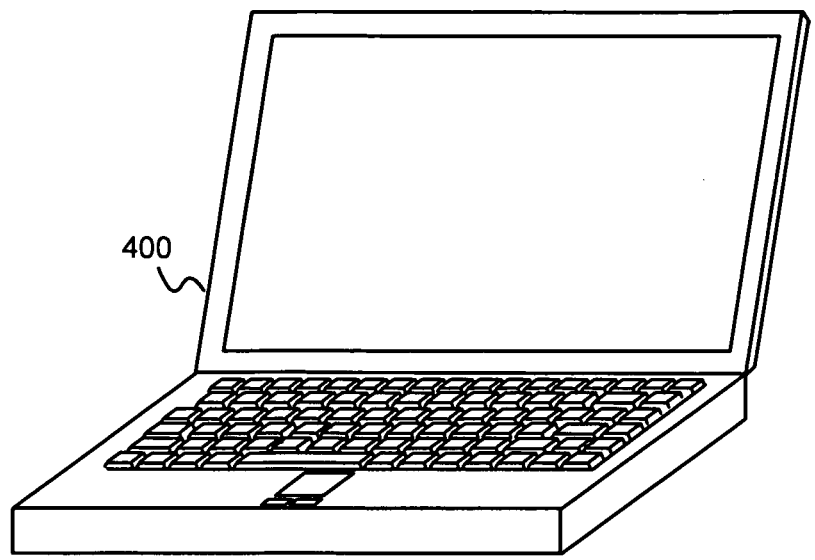
FIG. 4 is a perspective drawing illustrating one embodiment of a laptop computer in accordance with the present invention.

FIG. 4 is a perspective drawing illustrating one embodiment of a laptop computer 400 in accordance with the present invention. In one embodiment, the computer 400 is the computing device 100 of FIG. 1 and the mobile computing device 300 of FIG. 3. The computer 400 is configured to perform mobile computing. For example, the computer 400 may be used in a moving vehicle, on an airplane, or the like, exposing the computer 400 to motion.

Figure 5:
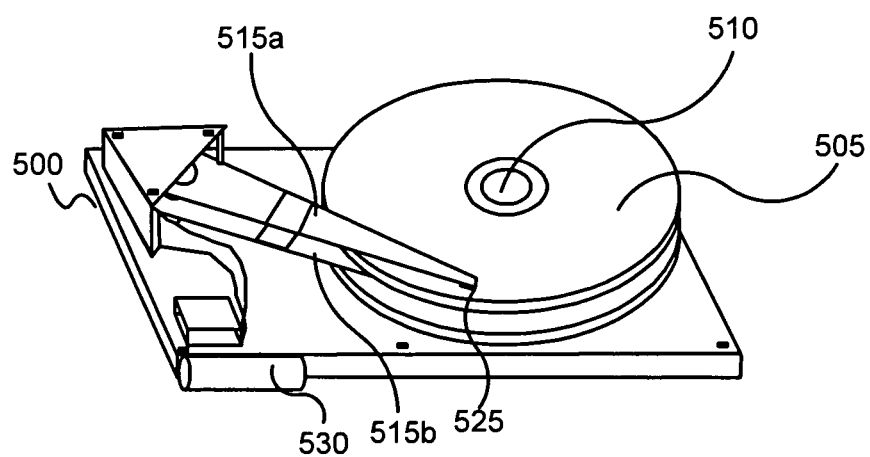
FIG. 5 is a perspective drawing illustrating one embodiment of a HDD in accordance with the present invention.

FIG. 5 is a perspective drawing illustrating one embodiment of a HDD 500 in accordance with the present invention. The HDD 500 may be the MSSD 115 of FIGS. 1 and 3. In addition, the laptop computer 400 of FIG. 4 may comprise the HDD 500. The HDD 500 is depicted physically connected to an accelerometer 530. The accelerometer 530 may comprise the motion sensor module 120 of FIGS. 1-3. The HDD 500 consists of several subcomponents including at least one platter 505 mounted on a spindle 510. The platter 505 is made of a material that allows magnetic polarizations to be applied to the upper or lower surfaces of the platter. The HDD 500 is configured to turn the spindle 510 and the platter 505 at several thousand revolutions per minute using a motor (not shown). The HDD 500 further includes at least one arm 515 that extends over the surface of the platter 505. As depicted, an upper arm 515a and a lower arm 515b extend just above and just below the upper and lower surfaces of the platter 505, respectively. Each arm 515 is configured with a head 525 that is capable of creating magnetic polarizations on the surface of the platter 505 and is also capable of detecting magnetic polarizations on the surface of the platter 505.

The upper and lower arms 515a, 515b are pivotally connected to the HDD 500 such that the heads 525 may move in an arc across the surface of the platter 505 while the platter 505 is spinning about the spindle 510, allowing the heads 525 to create and detect magnetic polarizations at any location on the platter 505. Multiple platters 505 may be stacked vertically, each platter 505 being centrally mounted on the same spindle 510 with an upper and lower arm 515a, 515b provided for each platter 505.

The HDD 500 is sensitive to sudden movements, jars, bumps and the like. A typical platter 505 may spin at 7200 revolutions per minute. The arms 515 move across the platter 505 at very high speeds. The head 525 is often described as flying over the platter 505, separated from the platter 505 by a thin cushion of air. Sudden movements of the hard disk 500 may cause the head 525 to touch the platter 505 or "crash." The physical contact of the head 525 with the platter 505 may cause damage to the platter 505, damage to the head 525, and irretrievable loss of data stored on the platter 505.

In order to prevent head crashes, the head 525 may be parked. Parking moves the arms 515 into a position that will not allow the head 525 to make physical contact with the platter 505. In one embodiment, parking protects the HDD 500 from damage such as head 525 crashes.

In one embodiment, the direction module 210 parks the head 525 of the HDD 500 when the direction module 210 is not directing data writes to the HDD 500. Parking the head 525 may protect the head 525 during intervals of HDD motion 500. The direction module 210 may further unpark the head 525 to write data from either the buffer 110 or the computation module 105 of FIG. 1.

Figure 6:
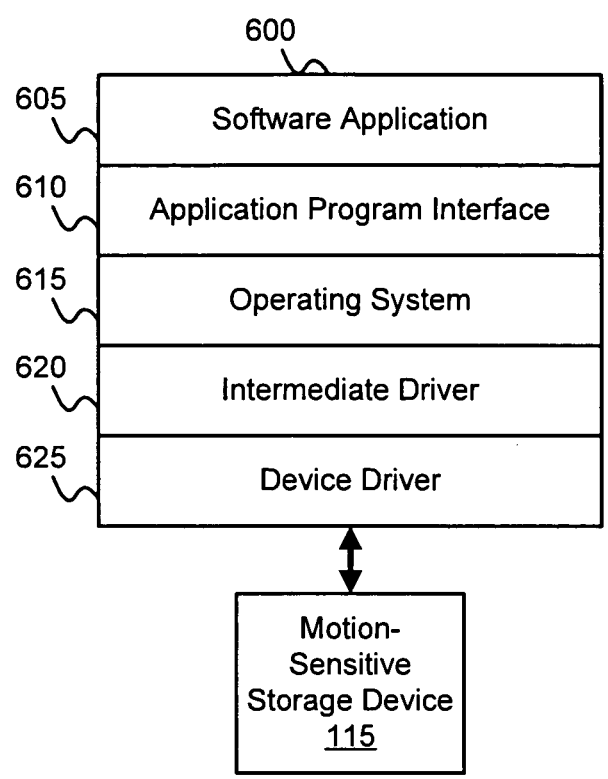
FIG. 6 is a schematic block diagram illustrating one embodiment of a software stack in accordance with the present invention.

FIG. 6 is a schematic block diagram illustrating one embodiment of a software stack 600 in accordance with the present invention. The software stack 600 is representative of one or more software processes executing on the computing device 100 of FIG. 1 or the mobile computing device 300 of FIG. 3. In the depicted embodiment, the software stack 600 includes a software application 605, an application program interface ("API") 610, an operating system 615, an intermediate driver 620, and a device driver 625.

The software stack 600 is depicted in communication with a MSSD 115 such as the MSSD 115 of FIG. 1. The software stack 600 may execute on the processor module 305 of FIG. 3 and communicate the MSSD 115 through the north bridge module 320 and south bridge module 325 of FIG. 3.

The operating system 615 may comprise one or more software processes configured to manage and direct the operation of the computing device 100 as is well known to those skilled in the art. The operating system 615 communicates with one or more software applications 605 through one or more APIs 610. Each API 610 may include a specified set of data values communicated between the software application and the operating system 615.

The software application 605 or operating system 615 may communicate through the API 610 by calling a function comprising the API 610 and passing the specified data values, either as data values or as a pointer to an array of the data values. For example, the software application 605 may write data to the MSSD 115 by calling an API 610 function and passing the data and one or more control data values to the API 610.

The operating system 615 manages communications between the software application 605 and the MSSD 115 and serves as the interface between the software application 605 and the MSSD 115. The operating system 615 is configured to operate with a plurality of unique modules such as the BIOS module 340, the network module 345, the USB module 350, the audio module 355, the PCI module 360, the MSSD 115, and the motion sensor module 120 of FIG. 3 using one or more device drivers 625. Each device driver 625 may be specific to a module. For example, an audio circuit comprising the audio module 355 may have a specific device driver 625 for communicating with the operating system 615. The operating system 615 interfaces with the audio module 355 using a device driver 625 specific to the audio module 355.

The operating system 615 communicates with the MSSD 115 using the device driver 625. The device driver 625 converts one or more generic commands and protocols from the operating system 615 into one or more commands and protocols specific to the MSSD 115. The device driver 625 also converts one or more MSSD 115 specific commands and protocols into one or more operating system 615 generic commands and protocols.

In the depicted embodiment, the operating system 615 and the MSSD 115 device driver 625 communicate through the intermediate driver 620. The intermediate driver 620 appears to the operating system 615 to be the device driver 625 and appears to the device driver 625 to be the operating system 615. Thus the operating system 615 may communicate generic commands and protocols to the intermediate driver 620 as though the intermediate driver 620 was the device driver 625. The intermediate driver 620 may forward the generic commands and protocols to the device driver 625 as though the intermediate driver 620 was the operating system 615.

In addition, the device driver 625 may communicate the MSSD 115 specific commands and protocols to the intermediate driver 620 as though the intermediate driver 620 was the operating system 615. The intermediate driver 620 may communicate the MSSD 115 specific commands and protocols to the operating system 615 as though the intermediate driver 620 was the device driver 625.

In one embodiment, intermediate driver 620 comprises the direction module 210 of FIG. 2. The direction module 210 may intercept a data write from the operating system 615 to the device driver 625 when the motion of the MSSD 115 exceeds a threshold motion. In one embodiment, the direction module 210 modifies the data write such that the intermediate driver 620 writes the data to the buffer 110 of FIG. 1 instead of to the device driver 625. The direction module 210 may also communicate to the operating system 615 that the data was written to the MSSD 115 when the data was written to the buffer 110.

In one embodiment, the intermediate driver 620 comprises the write module 215 of FIG. 2. The write module 215 may write the data from the buffer 110 to the device driver 625 and modify the data write such that the device driver 625 receives the data write as though from the operating system 615. In an alternate embodiment, the write module 215 may also communicate to the operating system 615 that the data was written to the MSSD 115 when the data was written to the MSSD 115 through the device driver 625.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
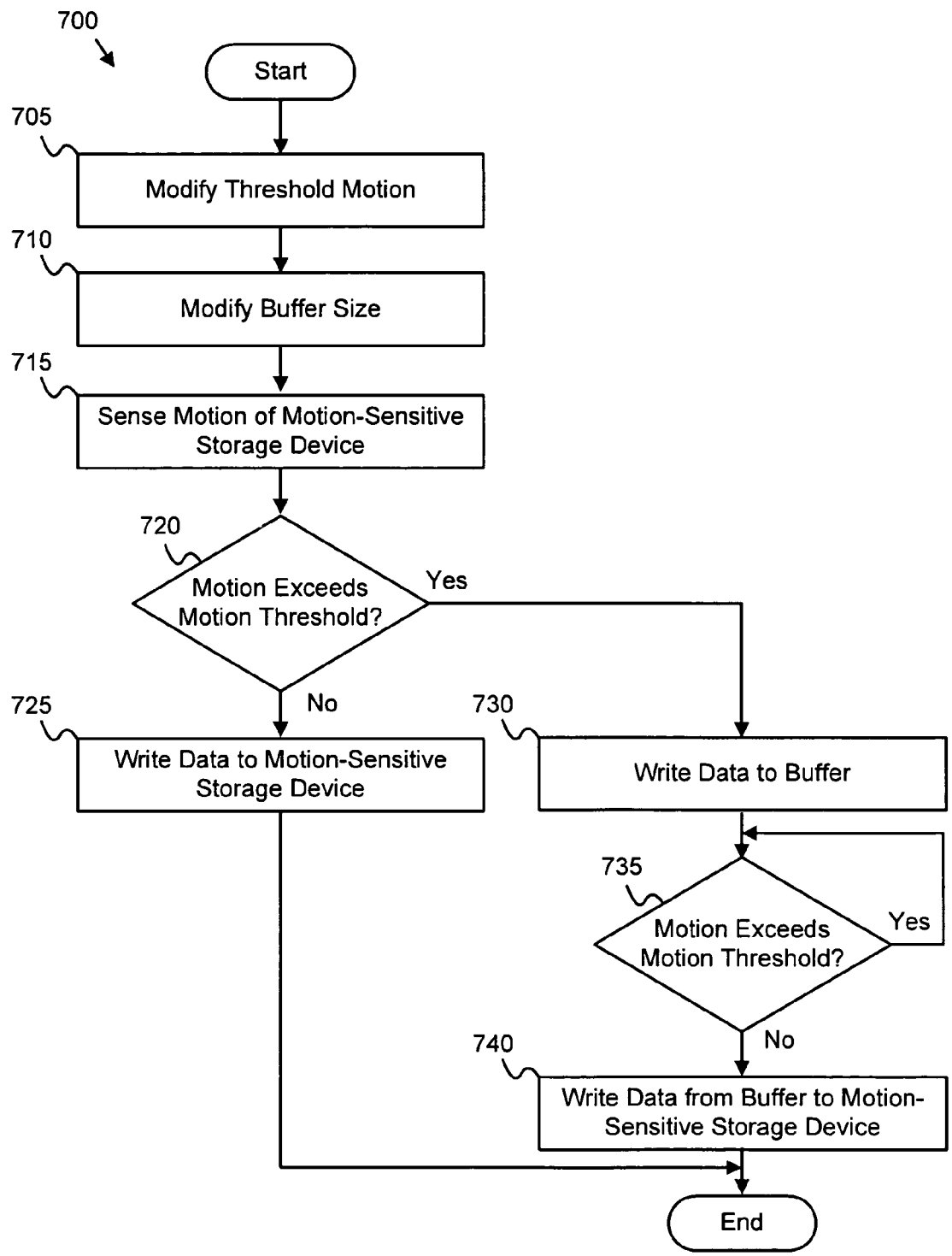
FIG. 7 is a schematic flow chart diagram illustrating one embodiment of a write buffering method of the present invention.

FIG. 7 is a schematic flow chart diagram illustrating one embodiment of a write buffering method 700 of the present invention. The method 700 substantially includes the steps necessary to carry out the functions presented above with respect to the operation of the described system 100 of FIG. 1 and apparatus 200 of FIG. 2.

In one embodiment, the method 700 begins and a threshold modification module 225 modifies 705 a threshold motion in response to a storage requirement of a software process. In one embodiment, the threshold motion is preset to a specified value such as one gravity (1 g). The software process may be a software application 605 such as the software application of FIG. 6. In a certain embodiment, the threshold modification module 225 is configured as an intermediate driver 620 such as the intermediate driver 620 of FIG. 6. The software application 605 may communicate the storage requirement through an API 610 such as the API 610 of FIG. 6 to an operating system 615 such as the operating system 615 of FIG. 6. The operating system 615 may communicate the operating requirement to the threshold modification module 225, and the threshold modification module 225 may modify 705 the threshold motion in response to the operating requirement.

In an alternate embodiment, the software application 605 links to a dynamically linked library ("DLL") comprised by the threshold modification module 225. The software application 605 may communicate the storage requirement to the DLL, and the threshold modification module 225 may modify 705 the threshold motion in response to the storage requirement.

In one embodiment, the storage requirement is configured as a latency requirement, specifying a maximum time interval the software application 605 can tolerate between writes to an MSSD 115 such as the MSSD 115 of FIG. 1. The threshold modification module 225 may modify 705 the threshold motion so that the motion of the MSSD 115 typically falls below the threshold motion within the maximum time interval. For example, if the storage requirement is a latency of five seconds (5 s), the threshold module may determine that the motion of MSSD 115 will fall below a threshold motion of one point five gravities (1.5 g) over a five second (5 s) interval ninety percent (90%) of the time for sufficient time to write data from the buffer 110 to the MSSD 115, and so modify 705 the threshold motion to one point five gravities (1.5 g).

In an alternate embodiment, the storage requirement may be configured as a motion value. For example, the software application 605 may specify a storage requirement of two gravities (2 g), and the threshold modification module 225 may modify the threshold motion to two gravities (2 g). In one embodiment, the threshold modification module 225 tracks the time intervals between software application 605 writes and modifies 705 the threshold motion such that the writes may be accommodated a specified percentage of the time. For example, the threshold modification module 225 may modify 705 the threshold motion to three gravities (3 g) if the threshold modification module 225 determines that the threshold motion of three gravities (3 g) will allow data to be written from the buffer 110 to the MSSD 115 ninety-five percent (95%) of the time.

In one embodiment, the threshold modification module 225 modifies the threshold motion by writing the new threshold motion value to a direction module 210. In an alternate embodiment, the threshold modification module 225 modifies the threshold motion by writing the new threshold motion value to a motion sensor module 120.

In one embodiment, a buffer modification module 220 may modify 710 the size of a buffer 110 such as the buffer 110 of FIG. 1 in response to the storage requirement of the software process such as the software application 605. In a certain embodiment, the buffer modification module 220 is configured as an intermediate driver 620. The software application 605 may communicate the storage requirement through an API 610 to the operating system 615. The operating system 615 may communicate the operating requirement to the buffer modification module 220, and the buffer modification module 220 modify 710 the buffer 110 size in response to the operating requirement.

In an alternate embodiment, the software application 605 links to a DLL comprised by the buffer modification module 220. The software application 605 may communicate the storage requirement to the DLL, and the buffer modification module 220 may modify 710 the buffer 110 size in response to the storage requirement.

In a certain embodiment, the buffer modification module 220 modifies 710 the buffer 110 size in response to observed storage requirements of the software application 605. For example, the buffer modification module 220 may track the maximum quantity of data written to the MSSD 115 by the software application 605. The buffer modification module 220 may further modify 710 the buffer 110 size to exceed the maximum quantity by ten percent (10%). In one embodiment, the storage requirement is configured as a data quantity such as two megabytes (2 MB). The buffer modification module 220 may modify 710 the buffer 110 size by allocating a block of data in a memory such as the memory module 315 of FIG. 3 equivalent to two megabytes (2 MB).

A motion sensor module 120 senses 715 the motion of the MSSD 115. In one embodiment, the motion sensor module 120 comprises a micro mechanical motion sensor such as one or more silicon cantilever beams or the like fabricated on a silicon substrate, wherein the motion sensor module 120 calculates the motion from one or more beams completing a circuit. In an alternate embodiment, the motion sensor module 210 comprises a laser gyroscope and calculates the motion of the MSSD 115 from the second derivative of the position of the laser gyroscope.

The direction module 210 determines 720 if the motion of the MSSD 115 exceeds the threshold motion. In one embodiment, the motion sensor module 120 notifies the direction module 210 if the MSSD 115 motion exceeds the threshold motion. In an alternate embodiment, the motion sensor module 120 communicates motion data to the direction module 210 and the direction module 210 determines 720 that the MSSD 115 motion exceeds the threshold motion if the motion data value exceeds the threshold motion value.

If the direction module 210 determines 720 the MSSD 115 motion exceeds the threshold motion, the direction module 210 writes 730 data destined for the MSSD 115 to the buffer 110. In one embodiment, the direction module 210 is configured as an intermediate driver 620 and intercepts write data destined for the MSSD 115. The direction module 210 may divert the write data to the buffer 110, and notify the software application 605 that the data was written to the MSSD 115.

In one embodiment, a write module 215 determines 735 if the MSSD 115 motion exceeds the threshold motion. The motion sensor module 120 may notify the write module 215 if the MSSD 115 motion exceeds the threshold motion. In an alternate embodiment, the motion sensor module 120 communicates the motion data to the write module 215 and the write module 215 determines 735 that the MSSD 115 motion exceeds the threshold motion if the motion data value exceeds the threshold motion value. If the MSSD 115 motion does not exceed the threshold motion, the write module 215 writes 740 the data from the buffer 110 to the MSSD 115 and the method 700 ends. If the MSSD 115 motion exceeds the threshold motion, the write module 215 loops to determine if the MSSD 115 motion exceeds the threshold motion.

If the direction module 210 determines 720 that MSSD 115 motion does not exceed the threshold motion, the direction module 210 writes 725 the data to the MSSD 115 and the method 700 ends. The method 700 writes data to the MSSD 115 when the MSSD 115 motion does not exceed the threshold motion while writing the data to the buffer 110 if the MSSD 115 motion does exceed the threshold motion, and thus reduces the likelihood of motion-related damage to the MSSD 115.

The present invention is the first to buffer write data destined for a MSSD 115 when the motion of the MSSD 115 exceeds a threshold motion. In addition, the present invention may reduce motion-related damage to the MSSD 115 by decreasing data writes to the MSSD 115 while the MSSD 115 is in motion. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. An apparatus comprising:
   a motion sensor configured to sense the motion of a motion-sensitive storage device; and
   a direction module configured to write data received from a computation module to a buffer if the motion exceeds a threshold motion and to the motion-sensitive storage device if the motion does not exceed the threshold motion, wherein the data is received after the motion sensor senses the motion.

2. The apparatus of claim 1, further comprising a write module configured to write the data from the buffer to the motion-sensitive storage device when the motion does not exceed the threshold motion.

3. The apparatus of claim 1, wherein the direction module is further configured to poll the motion sensor module for motion data.

4. The apparatus of claim 1, wherein the motion sensor module is further configured to communicate motion data to the direction module.

5. The apparatus of claim 1, wherein the motion sensor is configured to notify the direction module that the motion exceeds the threshold motion.

6. The apparatus of claim 1, wherein the direction module is further configured as an intermediate driver in communication with an operating system and a motion-sensitive storage device driver, the operating system and the motion-sensitive storage device driver communicating through the intermediate driver.

7. The apparatus of claim 1, further comprising a threshold modification module configured to modify the threshold motion in response to a storage requirement of a software process.

8. The apparatus of claim 1, wherein the motion sensor module comprises an accelerometer.

9. A system to buffer write data, the system comprising:
a processor configured to process data;
a memory configured to store data;
a motion-sensitive storage device configured to store data;
a motion sensor configured to sense the motion of the motion-sensitive storage device;
a direction module configured to write data received from the processor to the memory if the motion exceeds a threshold motion and to the motion-sensitive storage device if the motion does not exceed the threshold motion, wherein the data is received after the motion sensor senses the motion; and
a threshold modification module configured to modify the threshold motion in response to a storage requirement of a software process.

10. The system of claim 9, further comprising a write module configured to write the data from the memory module to the motion-sensitive storage device when the motion does not exceed the threshold motion.

11. The system of claim 9, wherein the motion-sensitive storage device is a hard disk drive.

12. The system of claim 9, wherein the system is a laptop computer.

13. A non-transitory computer readable medium tangibly embodying a program of machine-readable instructions executable by a digital processing apparatus to perform operations to buffer write data, the operations comprising:
sensing the motion of a motion-sensitive storage device;
determining if the motion exceeds a threshold motion;
writing data received from a computer processing device to a buffer if the motion exceeds the threshold motion and to the motion-sensitive storage device if the motion does not exceed the threshold motion, wherein the data is received after sensing the motion; and
modifying a size of the buffer in response to a storage requirement of a software process.

14. The computer readable medium of claim 13, wherein the instructions further comprise an operation to write the data from the buffer to the motion-sensitive storage device when the motion does not exceed the threshold motion.

15. The computer readable medium of claim 13, wherein the instructions further comprise an operation to poll for the motion data.

16. The computer readable medium of claim 13, wherein the instructions further comprise an operation to communicate the motion data.

17. The computer readable medium of claim 13, wherein the instructions further comprise an operation to communicate that the motion exceeds the threshold motion.

18. The computer readable medium of claim 13, wherein the instructions further comprise an operation to directly communicate between an operating system and a motion-sensitive storage device driver.

19. The computer readable medium of claim 13, wherein the instructions further comprise an operation to modify the threshold motion in response to a storage requirement of a software process.

20. The computer readable medium of claim 13, wherein an accelerometer senses the motion.

21. A method comprising:
sensing the motion of a motion-sensitive storage device;
determining if the motion exceeds a threshold motion; and
writing data received from a computer processing device to a buffer if the motion exceeds the threshold motion and to the motion-sensitive storage device if the motion does not exceed the threshold motion, wherein the data is received after sensing the motion.

22. The method of claim 21, further comprising writing the data from the buffer to the motion-sensitive storage device when the motion does not exceed the threshold motion.

23. The method of claim 21, further comprising modifying the threshold motion in response to a storage requirement of a software process.

* * * * *